United States Patent Office 3,436,422
Patented Apr. 1, 1969

3,436,422
PROCESS FOR THE PURIFICATION
OF FORMALDEHYDE
Ronald Harry Halliwell, Parkersburg, W. Va., assignor to
E. I. du Pont de Nemours and Company, Wilmington,
Del., a corporation of Delaware
No Drawing. Filed Apr. 11, 1966, Ser. No. 541,492
Int. Cl. C07c 47/04, 45/24
U.S. Cl. 260—606                                    8 Claims This invention relates to a process for the preparation of purified formaldehyde from a mixture containing formaldehyde and water. It is known in the art to produce purified formaldehyde from a mixture of formaldehyde and water by reacting the formaldehyde with an alcohol having a boiling point above about 95° C. to form a hemiformal, vacuum dehydrating the resultant mixture to produce a hemiformal solution containing substantially less water than was initially present and then pyrolyzing the hemiformal solution whereby the formaldehyde is released from the hemiformal followed by partial condensation of the pyrolysis products thus recovering the alcohol as a liquid and the formaldehyde as a vapor. Such a process is set forth in U.S. Patent No. 2,848,500, issued Aug. 19, 1958, to Dennis L. Funck.

In accordance with the teachings of this patent, the alcohol and the formaldehyde-water mixture are fed into a distillation column and heated under reduced pressure, for example about 25 mm. of mercury, and water is vaporized and removed. The preferred temperature range for the vacuum distillation is about 85° to 95° C. The resulting hemiformal mixture is now subjected to a pyrolysis step at atmospheric pressure and about 125°–160° C. This pyrolysis breaks down the hemiformal and vaporizes the alcohol and the formaldehyde. The vapors are then partially condensed resulting in formation of a liquid alcohol and a vaporous formaldehyde.

The present invention is an improvement over the process disclosed in the Funck patent. In carrying out the process of the Funck patent, some formaldehyde is removed from the feed mixture during the vacuum dehydration step, that is both formaldehyde and water are vaporized during this precedure. This requires further steps to be taken to recover the formaldehyde so removed from the mixture. Further inefficiency in the process of the Funck patent occurs during the pyrolysis step, for it is difficult to pyrolyze under conditions such that the hemiformal is efficiently broken down into its alcohol and formaldehyde components without the production of other by-products having much higher boiling points, such as formals of the alcohols. These high boiling formals are impurities which build up in concentration in the process and have to be removed to maintain efficient operation. They can conveniently be separated by distillation and then either buned or hydrolyzed back to the corresponding alcohol and formaldehyde by the use of a strong acid, like p-toluene sulfonic acid. It is consequently desirable to produce the lowest possible amount of these high boiling formals.

It has now been found that addition of catalytic amounts, for example between about 10 and about 10,000 parts per million parts of an organic alkali metal salt, to the formaldehyde-water mixture prior to carrying out the vacuum dehydration step, substantially reduces the amount of formaldehyde that is removed with the water during dehydration and substantially increases the efficiency of the pyrolysis break-down of the hemiformal and substantially decreases the amount of high boiling product formed during the dehydration and pyrolysis steps.

The salts employed are alkali metal salts of organic acids. Preferred salts are salts of acids having 1 to 8 carbon atoms. Salts found particularly effective are the potassium and lithium salts of organic acids. Since formic acid is a normal component of systems containing aqueous formaldehyde, the formate salts are preferred, although salts such as acetates, glycolates, salts of ethylene diamine tetra-acetic acid are suitable. The presence of small amounts of borate ion when used with these salts further improves the results. The borate ion may be supplied as a boric salt or as boric acid in the presence of other alkali salts. It is desirable, but not essential, that the salts stay in solution since if they separate out they can accelerate fouling of the heating surfaces. Higher concentrations can be kept in solution if small amounts of a solubilizing agent, such as ethylene glycol is added. Since the salts are generally not highly soluble in the mixtures of water and hemiformals, it is preferred to add the salt as a solution in water or in ethylene glycol. When salts are of acids, other than monocarboxylic acids, it is not necessary that they be completely neutralized. Thus, in the case of ethylene diamine tetra-acetic acid salts, it is sufficient if only one of the carboxylic acid groups is neutralized; however, it is preferred that at least about half of the groups be neutralized.

As is pointed out in the Funck patent, various alcohols may be employed to produce the hemiformal mixtures provided that the alcohols have boiling points above about 95° C. and preferably above 120° C. Suitable alcohols include 3-methyl-1-butanol, 1-hexanol, 2-methyl-1-pentanol, 4-methyl-2-pentanol, methyl hexanol, 1-heptanol, cyclopentanol, cyclohexanol, cycloheptanol, methyl cyclohexanol, ethylene glycol, propylene glycol, diethylene glycol, triethylene glycol monomethyl ether, 2-ethoxy ethanol, 2-butoxy ethanol, 2,2-dimethyl propanol-1, 2-methyl butanol-2, dimethyl hexanols, allyl alcohol, benzyl alcohol, 3-chloropropanol, beta-hydroxy propionitrile, furfuryl alcohol, 2-ethyl hexanol, and diisobutyl carbinol.

The addition of the catalytic amount of salt does not affect the other process conditions set forth in the Funck patent, thus the vacuum dehydration is still preferably carried out at a pressure of about 20 to 40 mm. mercury absolute and at a bottoms temperature of 60° to 90° C. and the pyrolyzing step is carried out at atmospheric pressure and at a temperature dependent upon the particular alcohol employed in forming the hemiformal, but usually in the range of about 125° C. to about 160° C.

In the following examples which illustrate the invention all parts and percentages are in parts by weight unless otherwise specified.

Example I

A sample of 2 kilograms of cyclohexyl hemiformal containing 24% formaldehyde and 3% water was heated in a 3 liter glass pot at a pressure of 25 mm. mercury. The sample boiled at 63° C. The first 5 grams of the sample was totally condensed and analyzed and found to contain 24% formaldehyde.

The above procedure was repeated with an identical sample, only this time potassium formate was added in the amount of 1000 parts per million parts of the mixture. Analysis of the first 5 grams of distillate showed it to contain 17.5% formaldehyde.

Example II

A sample of 45 grams of cyclohexyl hemiformal formed by reacting 50 parts of cyclohexanol with 30 parts of 59% formaldehyde followed by vacuum dehydration at 90° C. and 25 mm. of mercury, containing about 24% by weight formaldehyde, was heated to 150° C. in an open 150 cc. beaker with vigorous agitation. Analysis of the residual 32 grams of product in the beaker showed that 15.8% of the product was formaldehyde in the form of cyclohexyl hemiformal.

This procedure was repeated, only this time 0.7% of a salt mixture containing 84% by weight potassium formate and 16% by weight lithium formate was added prior to heating. The residual 25 grams of product contained 5% formaldehyde in the form of cyclohexyl hemiformal.

This procedure was again repeated using the same cyclohexyl hemiformal, only this time .7% by weight of a salt mixture containing 84 parts potassium formate, 16 parts lithium formate and 2 parts boric acid were added. The residual 25 grams of product contained 1.5% by weight formaldehyde in the form of cyclohexyl hemiformal.

Example III

One hundred grams of cyclohexyl hemiformal containing 24% by weight formaldehyde and 130 parts per million parts of a salt mixture of 95% potassium formate and 5% lithium formate was heated at 150° C. in an open beaker. Analysis of the residual 50 grams of cyclohexyl hemiformal showed that 10.8% by weight formaldehyde was still present. The example was repeated adding the various salts listed below and gave the results shown in the table.

| Salt | Amount Added Prior to Heating, p.p.m. | Content of HCHO in Residue |
|---|---|---|
| Potassium Formate | 500 | 8.2 |
| Do | 1,000 | 7.8 |
| Potassium Borate | 1,000 | 3.8 |
| Lithium Borate | 1,000 | 3.2 |
| Boric Acid | 1,500 | 9.4 |

Example IV

Thirty parts of 59% formaldehyde in water was well mixed with 50 parts of cyclohexanol and fed continuously into a series of staged kettles maintained at a pressure of 25 mm. The first kettle was maintained at 40°–45° C. and subsequent kettles at increasing temperatures until the last one which operated at 70°–80° C. The product continuously removed from this dehydration system contained 0.8% water. Water vapor and some formaldehyde were continuously removed from the top of all kettles and combined into one stream. The amount of formaldehyde removed with the overhead vapor was measured. One hundred parts per million parts of the feed streams of a salt composition consisting of 89% potassium formate, 5% lithium formate, 5% boric acid, and 1% ethylene diamine tetra-acetic acid were then continuously fed into the kettle. The amount of formaldehyde removed with the water was again measured and found to be 24% less than without the salt addition.

Example V

The dehydrated cyclohexyl hemiformal of the first portion of Example IV (the portion without salt addition) was passed into a pyrolyzer consisting of a separator and a calandria. The separator is filled with a number of distillation plates. The hemiformal stream from the vacuum hydrator enters the pyrolyzer on top of these plates and flows down into and is heated by gases rising from the separator. Liquid from the separator is circulated through a calandria where it is heated under atmospheric pressure to 150°–165° C. and back into the separator. The purpose of the plates is to help in the stripping of the formaldehyde from the feed and hence enrich the formaldehyde content of the overhead. Alcohol and formaldehyde vapors are removed overhead and subjected to a partial condensation, thus condensing the alcohol. The non-vaporized material was removed continuously from the bottom of the separator. Analysis of this stream showed it to contain an average of 5.1% formaldehyde, largely as hemiformal and, in addition, it contained cyclohexyl formals and other stable high boiling compounds.

The dehydrated cyclohexyl hemiformals of the second portion of Example IV (with salt addition) was likewise passed through the pyrolyzer under the same conditions of pressure and temperaure and flow rate as the material not containing salt. Analysis of the stream purged from the bottom of the separator showed only 2.5% was formaldehyde and the rate of formation of the cyclohexyl formals and other high boilers was reduced tenfold.

Example VI

Fifty parts of 2-ethyl hexanol were well mixed with 30 parts of 59% formaldehyde in water and the mixture subjected to vacuum dehydration. The resulting hemiformal contained 26.4% formaldehyde and 0.46 water. This hemiformal was pyrolyzed by heating in an open beaker with good stirring to 155° C. There was a loss of 35.0% of the weight and the pot contents analyzed 6.95% formaldehyde.

The same experiment was repeated using the same hemiformal but to which had been added 0.20% potassium formate and 0.20% boric acid. After heating to 155° C. with good stirring, the weight loss was 38% and the pot content analyzed 1.1% formaldehyde. Thus, addition of the salts increased the recovery of formaldehyde during pyrolysis from 82.9% to 97.4%.

I claim:

1. In a process for the preparation of purified formaldehyde from a mixture comprising formaldehyde, water, an alcohol having an atmospheric boiling point of at least about 95° C. and being substantially free of any substitutent group other than hydroxyl group which is reactive with formaldehyde under process conditions, and the hemiformal reaction product of said alcohol and formaldehyde, which comprises vacuum dehydrating the mixture followed by pyrolyzing the dehydrated mixture and separating purified formaldehyde, the improvement which comprises adding at least one salt selected from the group consisting of alkali metal salts of formic and boric acid and partial salts of ethylene diamine tetra-acetic acid, and mixtures thereof to said mixture prior to conducting the vacuum dehydrating, said salt being added in a catalytic amount.

2. The process of claim 1 in which the vacuum dehydrating is carried out at a pressure of about 20 to 40 mm. of mercury absolute, at a bottoms temperature of 60° to 90° C., in which pyrolyzing is carried out at atmospheric pressure and at a temperature in the range of about 125° C. to about 160° C., and in which the salt concentration is between about 10 and about 10,000 parts per million parts of the mixture.

3. The process of claim 1 in which the salts are selected from the class consisting of lithium and potassium.

4. The process of claim 1 in which the separating is accomplished by partial condensation of the vapors produced by the pyrolyzing step, whereby the alcohol is condensed and the formaldehyde is recovered as a vapor.

5. The process of claim 2 in which the alcohol is cyclohexanol.

6. The process of claim 5 in which the salt is a mixture of potassium and lithium formates and borates.

7. The process of claim 2 in which the alcohol is 2-ethylhexanol.

8. The process of claim 7 in which the salt is a mixture of potassium lithium formates and borates.

No references cited.

LEON ZITVER, *Primary Examiner.*

R. H. LILES, *Assistant Examiner.*